United States Patent
Ieong et al.

(10) Patent No.: US 6,473,776 B2
(45) Date of Patent: Oct. 29, 2002

(54) AUTOMATIC PRUNNING FOR LOG-BASED REPLICATION

(75) Inventors: Ion Tim Ieong, Sunnyvale; Patricia Lorraine Shimer, Hollister, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/365,953

(22) Filed: Aug. 2, 1999

(65) Prior Publication Data

US 2002/0116356 A1 Aug. 22, 2002

Related U.S. Application Data

(60) Provisional application No. 60/129,618, filed on Apr. 16, 1999.

(51) Int. Cl.[7] .............................................. G06F 12/16
(52) U.S. Cl. ...................... 707/202; 707/204; 707/101
(58) Field of Search ................................ 707/101, 200, 707/202, 204

(56) References Cited

U.S. PATENT DOCUMENTS

| | | | |
|---|---|---|---|
| 5,412,384 A | | 5/1995 | Chang et al. .................. 341/79 |
| 5,553,279 A | | 9/1996 | Goldring ..................... 707/201 |
| 5,581,754 A | | 12/1996 | Terry et al. ..................... 707/8 |
| 5,600,316 A | | 2/1997 | Moll ........................... 341/87 |
| 5,640,561 A | | 6/1997 | Satoh et al. ................. 707/202 |
| 5,761,676 A | * | 6/1998 | Wood et al. ................. 707/202 |
| 5,806,074 A | | 9/1998 | Souder et al. ............... 707/202 |
| 5,809,295 A | | 9/1998 | Straub et al. .................. 707/1 |
| 5,864,839 A | | 1/1999 | Bourgoin ........................ 707/1 |
| 5,893,116 A | | 4/1999 | Simmonds et al. .......... 707/201 |
| 5,953,729 A | * | 9/1999 | Cabrera et al. .............. 707/204 |
| 5,956,504 A | * | 9/1999 | Jagadish et al. ............. 707/101 |
| 5,956,735 A | * | 9/1999 | Clark et al. .................. 707/206 |
| 5,999,935 A | * | 12/1999 | Clark et al. .................. 707/101 |
| 6,014,673 A | * | 1/2000 | Davis et al. ................. 707/202 |
| 6,163,856 A | * | 12/2000 | Dion .............................. 714/4 |
| 6,182,086 B1 | * | 1/2001 | Lomet et al. ................ 707/202 |
| 6,192,365 B1 | * | 2/2001 | Draper et al. ................ 707/101 |
| 6,253,212 B1 | * | 6/2001 | Loaiza et al. ................ 707/202 |

FOREIGN PATENT DOCUMENTS

| | | |
|---|---|---|
| WO | WO 98/38564 | 9/1998 |
| WO | WO 98/40804 | 9/1998 |

OTHER PUBLICATIONS

IBM Technical Disclosure Bulletin, "Managing Resource Definitions in Distributed Systems", v38, n12, Dec. 12, 1995, pp. 81–83.

IBM Technical Disclosure Bulletin, "Cache Memory Structure for Tolerating Faults", v38, n5, May 5, 1995, 589–590.

P. Samarati, *Data & Knowledge Engineering*, v18, No. 1, pp. 55–84, Feb. 1996,. (1–Page Abstract).

* cited by examiner

*Primary Examiner*—John Breene
*Assistant Examiner*—Khanh Pham
(74) *Attorney, Agent, or Firm*—Gates & Cooper LLP

(57) ABSTRACT

Automatic pruning of a log used in log-based replication of database tables within a relational database management system. An optimal point at which to prune the log is periodically determined, such that the optimal point provides a minimum amount of storage space for the log and yet ensures that all updates to the database table can be properly replicated from the log. The log is then automatically pruned of selected records prior to the optimal point.

24 Claims, 2 Drawing Sheets

AUTOMATIC PRUNNING FOR LOG-BASED REPLICATION

CROSS-REFERENCE TO RELATED APPLICATIONS

This application claims the benefit under 35 U.S.C. §119 (e) of co-pending and commonly-assigned U.S. Provisional application Serial No. 60/129,618, entitled "AUTOMATIC PRUNING FOR LOG-BASED REPLICATION," filed on Apr. 16,1999, by Ion T. Ieong and Patricia L. Shimer, which application is incorporated by reference herein.

BACKGROUND OF THE INVENTION

1. Field of the Invention

This invention relates in general to database management systems performed by computers, and in particular, to automatic pruning for log-based replication of tables within a relational database management system.

2. Description of Related Art

Database replication refers to the process of duplicating the data contained in source database tables and placing it in another set of corresponding target database tables, either completely or partially, as well as either locally or remotely, and synchronously or asynchronously. Often, when the data in the original source tables is updated, it is generally more efficient to propagate the updates to the target tables, rather than duplicating all the data contained in the source tables.

In general, relational databases store updates in a journal (hereinafter referred to as a log) for recovery reasons, in addition to writing the updates permanently to the tables stored on disks. Log-based replication refers to the asynchronous process of reading the updates to the tables from the log and propagating the updates to the target tables.

The database log requires significant disk space since it grows as updates are made to the database tables. Therefore, the old data in the log needs to be deleted (hereafter referred to as pruned), if it is no longer needed for database recovery operations. On the other hand, log-based replication requires that the log be available to capture the updates to the database tables. As a result, the log-based replication and the pruning of the log have to be coordinated to prevent missing any updates in the target tables. It is non-trivial to determine what the optimal point is to satisfy both the log-based replication and the pruning of the log.

SUMMARY OF THE INVENTION

To overcome the limitations in the prior art described above, and to overcome other limitations that will become apparent upon reading and understanding the present specification, the present invention discloses a method, apparatus, and article of manufacture for automatic pruning of a log used in log-based replication of database tables within a relational database management system. An optimal point at which to prune the log is periodically determined, such that the optimal point provides a minimum amount of storage space for the log and yet ensures that all updates to the database table can be properly replicated from the log. The log is then automatically pruned of selected records prior to the optimal point.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

The present invention determines an optimal point at which to prune a database log, such that it requires the minimum amount of disk space, and yet ensures all the updates to database tables can be properly replicated. The optimal point is periodically re-determined and the log is automatically pruned. Thus, the present invention not only minimizes the amount of space required to replicate the database tables, but also relieves users of the burden of manual interaction with the computer to continuously monitor space usage and consumption.

HARDWARE AND SOFTWARE ENVIRONMENT

Figure 1:
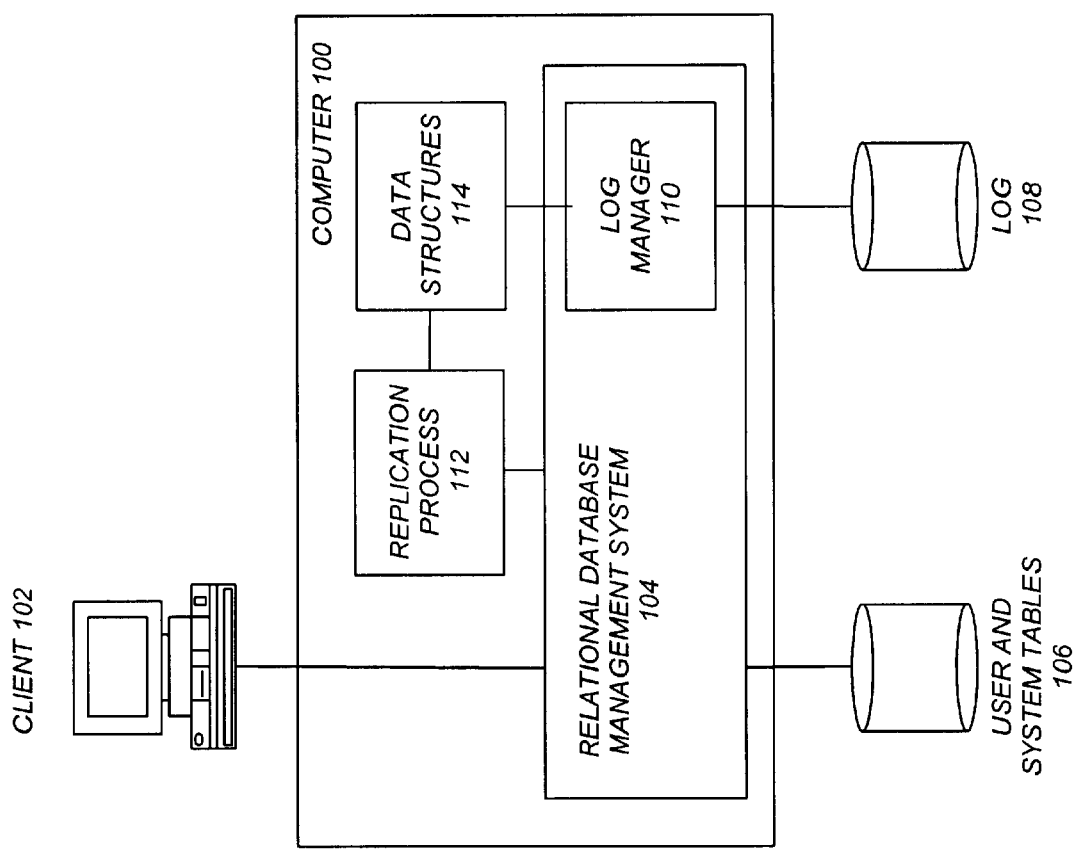
FIG. 1 illustrates the hardware and software environment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) 104 that manages user and system tables 106, and includes a log 108. In the preferred embodiment of the present invention, the RDBMS 104 comprises the DataBase 2 (DB2™) Universal DataBase (UDB™) product offered by IBM Corporation, although those skilled in the art will recognize that the present invention has application to any RDBMS 104.

As illustrated in FIG. 1, the RDBMS 104 includes a log manager process 110 to manage log data sets 108, and a replication process 112 interfaces to the RDBMS 104 and log manager process 110 to manage the replication of updates to the tables 106. The replication process 112 includes one or more main-memory resident data structures 114 that are used to control the operation of the replication process 110.

Generally, the RDBMS 104, tables 106, log 108, log manager process 110, replication process 112, and data structures 114 each comprises logic and/or data that is embodied in or retrievable from a device, medium, or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions accessible from any computer-readable device, carrier, or media.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

OPERATION OF AUTOMATIC PRUNING

In general, the log 108 is comprised of a time series of records. In the preferred embodiment, it is assumed that each log 108 record has a unique ascending log 108 sequence number, although other sequences could be used as well.

A transaction generally involves updating one or more data rows in one or more of the tables 106, which results in the creation of one or more records in the log 108. Log 108 records belonging to different data rows can interleave with each other on the log 108.

To search for the log 108 record corresponding to the updates made to the tables 106, the replication process 112 reads the log 108 sequentially. When it processes a log 108 record, the replication process 112 advances a current log 108 record pointer.

The replication process 112 re-assembles data rows from the log 108 records in transient, main-memory resident, data structures 114. These data structures 114 track all of the data rows being reassembled by the replication process 112.

The replication process 112 also determines the optimal point to prune the log 108. When the replication process 112 finds the first log 108 record for a data row, the log 108 sequence number for that log 108 record is marked. When a data row is re-assembled, replication process 112 removes it from the main-memory data structures 114 and stores it on disk (or other persistent storage) for later propagation of the updates. The optimal prune point is thus obtained by selecting the minimum log 108 sequence number that marks the first log 108 sequence number encountered for each data row reassembled in the main memory data structure 114. If the minimum log 108 sequence number is null, e.g., there are no data rows being reassembled in the main-memory data structures 114, then the optimal prune point defaults to the current log 108 record pointer being processed by the replication process 112.

All the log 108 records with log 108 sequence number smaller than the prune point may be safely pruned by the log manager process 110. This is essential to ensure correctness, because if the event occurs that the replication process 112 terminates and is not able to save all of its data, all the updates kept in persistent storage are safe; however, the main-memory data structures 114, being transient, are lost. Therefore, when the replication process 112 restarts, all it needs to do is reconstruct the main-memory data structures 114 by re-scanning the log 108 records from the prune point onward. Therefore, no updates are lost.

The replication process 112 passes the optimal prune point to the log manager process 100 for automatic pruning. To enhance efficiency, a threshold is selected that can best balance efficiency and performance. The threshold may be a counter that is used to keep track of the number of log 108 records and data rows processed since the last prune point, or the threshold may be a specified time lapse since the last prune point, or the threshold may comprise any number of other events. When the amount of data rows being processed reaches that threshold, the optimal prune point is then determined and delivered to the log manager process 110, which in turn automatically prunes the log 108 records, since they will not be needed in the future. As a result, user interaction and monitoring are not required, and the log manager process 110 frees up unneeded storage as soon as possible during replication.

LOGIC OF AUTOMATIC PRUNING

Figure 2:
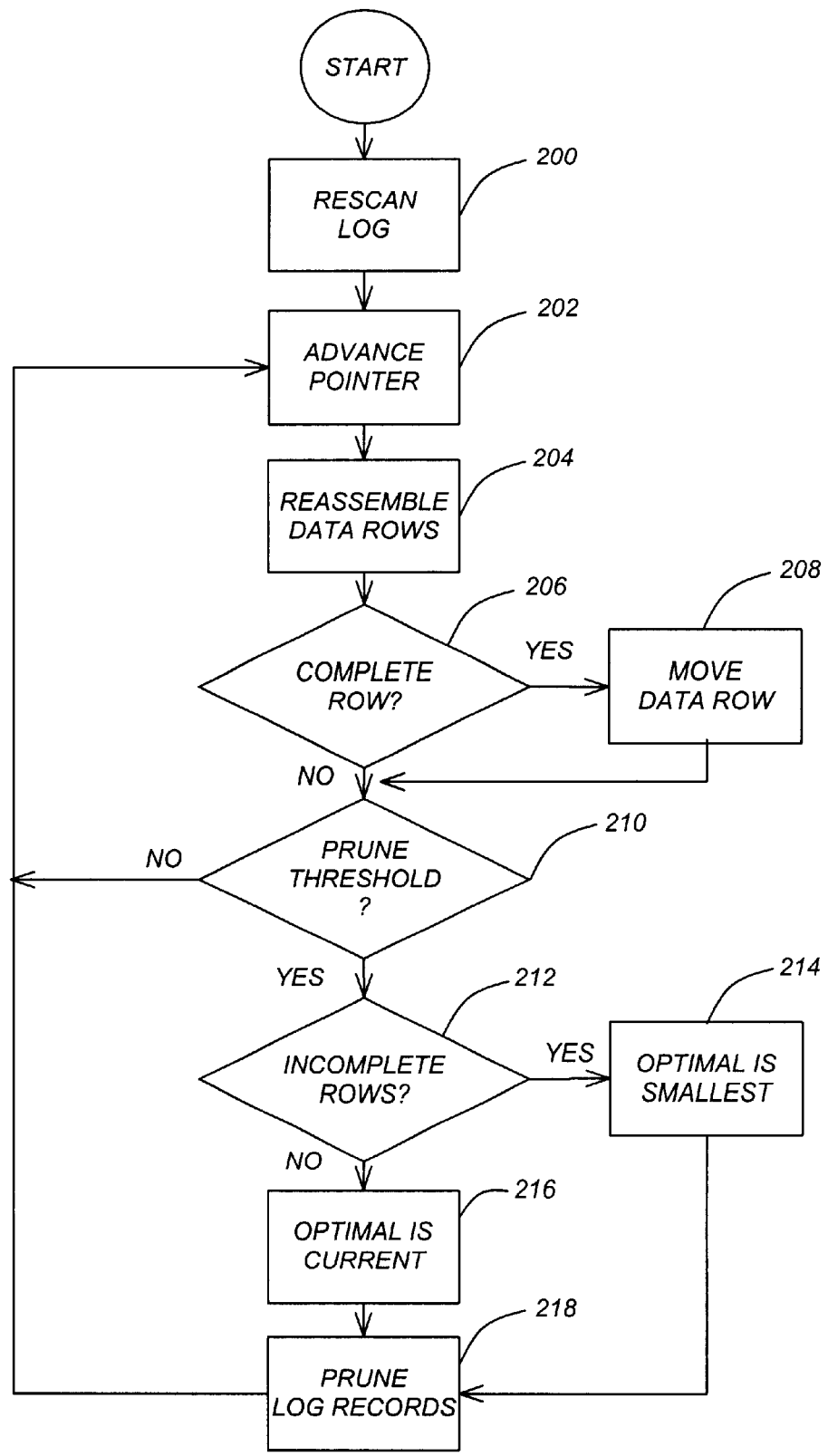
FIG. 2 is a flowchart that illustrates the logic of automatic pruning according to the preferred embodiment of the present invention.

FIG. 2 is a flowchart that illustrates the logic of automatic pruning according to the preferred embodiment of the present invention.

First, at the initialization stage, Block 200 represents the replication process 112 rescanning all of the log 108 records between the last prune point and the current log 108 record pointer for incomplete data rows. Thereafter, the replication process 112 is ready to process new log 108 records.

Block 202 represents the replication process 112 advancing the current log 108 record pointer.

Block 204 represents the replication process 112 performing a scan in the log 108 record pointed to by the pointer and reassembling the data rows from the log 108 records in the main-memory data structure 114. This Block also represents the replication process 112 marking the first log 108 sequence number for the first log record for each data row in the main-memory data structure 114 that are to be used in determining the optimal prune point.

Block 206 is a decision block that represents the replication process 112 determining whether there is a complete data row in the main-memory data structure 114. If so, control transfers to Block 208, which represents the replication process 112 moving the complete data row from the main-memory data structure 114 and storing it on disk (or other persistent storage) for later propagation to the target table; otherwise, control transfers Block 210.

Block 210 is a decision block that represents the replication process 112 determining whether the prune threshold has been reached. If not, control transfers back to Block 202, which represents the replication process 112 processing more log 108 records; otherwise, control transfers to Block 212.

Block 212 is a decision block that represents the replication process 112 determining whether there are any incomplete data rows being processed, based on an examination of the main-memory data structure 114. If not, control transfers to Block 216, which represents the replication process 112 setting the optimal prune point to the current log 108 record pointer, otherwise, control transfers to Block 214, which represents the replication process 112 setting the optimal prune point to the smallest of log sequence numbers representing the first log record for the incomplete data rows in the main-memory data structure 114.

Block 218 represents the log manager process 110 using the optimal prune point to prune all of the log 108 records below the optimal prune point and then releasing the occupied disk space. Thereafter, control transfers back to Block 202, which represents the replication process 112 processing more log 108 records.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. Moreover, many types of databases could benefit from the present invention. In addition, any software program performing log-based replication (or its equivalent) could benefit from the present invention.

In summary, the present invention discloses a method, apparatus, and article of manufacture for automatic pruning of a log used in log-based replication of database tables within a relational database management system. An optimal point at which to prune the log is periodically determined, such that the optimal point provides a minimum amount of storage space for the log and yet ensures that all updates to the database table can be properly replicated from the log. The log is then automatically pruned of selected records prior to the optimal point.

The foregoing description of the preferred embodiment of the invention has been presented for the purposes of illustration and description. It is not intended to be exhaustive or to limit the invention to the precise form disclosed. Many modifications and Variations are possible in light of the above teaching. It is intended that the scope of the invention be limited not by this detailed description.

What is claimed is:

1. A computer-implemented method for automatic pruning of a log used in a log-based replication of at least one database table within a relationable database management system, comprising:
   (a) re-assembling at least one data row of the database table in at least one database structure from the log records;
   (b) marking a first log record for the data row being re-assembled;
   (c) removing the data row from the data structure when it is re-assembled;
   (d) identifying the marked first log record as an optional point at which to prune the log when the data row is removed from the data structure, in order to provide a minimum amount of storage space form the log, and yet ensures that all updates to the data table can be properly replicated from the log; and
   (e) automatically pruning the log of selected records prior to the optimal point.

2. The method of claim 1 above, further comprising periodically re-determining the optimal point.

3. The method of claim 1 above, further comprising identifying a current log record as the optimal point where there is no marked first log record.

4. The method of claim 1 above, wherein;
   the marking step (b) further comprises marking a first log record for each of the data rows being re-assembled;
   the removing step (c) further comprises removing a specific one of the data rows from the data structure when it is re-assembled; and
   the identifying step (d) further comprises identifying an earliest one of the marked first log records as the optimal point when the data rows are removed from the data structure.

5. The method of claim 1 above, further comprising pruning all log records before the optimal point from the log.

6. The method of claim 1 above, further comprising identifying a threshold for the pruning step.

7. The method of claim 6 above, wherein the threshold comprises a number of data rows processed since a last occurrence of the pruning step.

8. The method of claim 6 above, wherein the threshold comprises a specified time lapse since a last occurrence of the pruning step.

9. A computer-implemented apparatus for automatic pruning of a log used in a log-based replication of at least one database table within a relational database management system, comprising:
   (a) a computer; and
   (b) means, performed by the computer, for re-assembling at least one data row of the database table in at least one database structure from the log records;
   (c) means, performed by the computer, for re-assembling at least one data row being re-assembled;
   (d) means, performed by the computer, for removing the data row from the data structure when it is re-assembled;
   (e) means, performed by the computer, for identifying the marked first log record as an optimal point at which to prune the log when the data row is removed from the data structure, in order to provide a minimum amount of storage space for the log, and yet ensures that all updates to the database table can be properly replicated from the log; and
   (f) means, performed by the computer, for automatically pruning the log of selected records.

10. The apparatus of claim 9 above, further comprising means for periodically re-determining the optimal point.

11. The apparatus of claim 9 above, further comprising means for identifying a current log record as the optimal point when there is no marked first log record.

12. The apparatus of claim 9 above, wherein;
   the means marking (c) further comprises means for marking a first log record for each of the data rows being assembled;
   the means for removing (d) further comprises means for removing a specific one of the data rows from the data structure when it is re-assembled; and
   the means for identifying (e) further comprises means for identifying an earliest one of the marked first log records as the optional point when the data rows are removed from the data structure.

13. The apparatus of claim 9 above, further comprising means for pruning all log records before the optimal point from the log.

14. The apparatus of claim 9 above, further comprising means for identifying a threshold for the pruning.

15. The apparatus of claim 14 above, wherein the threshold comprises a number of data rows processed since a last occurrence of the pruning.

16. The apparatus of claim 14 above, wherein the threshold comprises a specified time lapse since a last occurrence of the pruning.

17. An article of manufacture embodying logic for automatic pruning of a log used in log-based replication of at least one database table within a relational database management system, comprising:
   (a) re-assembling at least one data row of the database table in at least on data structure from the records;
   (b) marking a first log record for the data row being re-assembled;
   (c) removing the data row from the data structure when it is re-assembled;
   (d) identifying the marked first log record as an optional point at which to prune the log when the data row is removed from the data structure, in order to provide a minimum amount of storage space for the log, and yet assures that all updates to the database table can be properly replicated from the log; and (e) automatically pruning the log of selected records prior to the optimal point.

18. The method of claim 17 above, further comprising periodically re-determining the optimal point.

19. The method of claim 17 above, further comprising identifying a current log record as the optimal point when there is no marked first log record.

20. The method of claim 17 above, wherein:

the marking step (b) further comprises marking a first log record for each of the data rows being re-assembled;

the removing step (c) further comprises removing a specific one of the data rows from the data structure when it is re-assembled; and the identifying step (d) further comprises identifying an earliest one of the marked first log records as the optimal point when the data rows are removed from the data structure.

21. The method of claim 17 above, further comprising pruning all log records before the optimal point from the log.

22. The method of claim 17 above, further comprising identifying a threshold for the pruning step.

23. The method of claim 22 above, wherein the threshold comprises a number of data rows processed since a last occurrence of the pruning step.

24. The method of claim 22 above, wherein the threshold comprises a specified time lapse since a last occurrence of the pruning step.

* * * * *

UNITED STATES PATENT AND TRADEMARK OFFICE
CERTIFICATE OF CORRECTION

PATENT NO. : 6,473,776 B2
DATED : October 29, 2002
INVENTOR(S) : Ion Tim Leong and Patricia Lorraine Shimer It is certified that error appears in the above-identified patent and that said Letters Patent is hereby corrected as shown below:

<u>Title page, Item [54] and Column 1, line 1,</u>
After "AUTOMATIC", "PRUNNING" should read -- PRUNING --

<u>Column 6,</u>
Line 11, "database" should read -- data --
Lines 12-13, "re-assembling at least one" should read -- marking a first log record for the --
Line 26, insert -- prior to the optimal point. -- after "records"
Line 60, "records" should read -- log records --

Signed and Sealed this

Fifth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,473,776 B2
DATED         : October 29, 2002
INVENTOR(S)   : Ion Tim Ieong and Patricia Lorraine Shimer It is certified that error appears in the above-identified patent and that said Letters Patent is hereby corrected as shown below:

<u>Title page, Item [54] and Column 1, line 1,</u>
After "AUTOMATIC", "PRUNNING" should read -- PRUNING --

<u>Column 6,</u>
Line 11, "database" should read -- data --
Lines 12-13, "re-assembling at least one" should read -- marking a first log record for the --
Line 26, insert -- prior to the optimal point. -- after "records"
Line 60, "records" should read -- log records --

This certificate supersedes Certificate of Correction issued August 5, 2003.

Signed and Sealed this

Second Day of December, 2003

JAMES E. ROGAN
*Director of the United States Patent and Trademark Office*